W. G. HAIGLER.
PNEUMATIC VEHICLE TIRE.
APPLICATION FILED MAY 8, 1916.

1,252,107.

Patented Jan. 1, 1918.
2 SHEETS—SHEET 1.

Inventor
William G. Haigler,
By
Attorneys

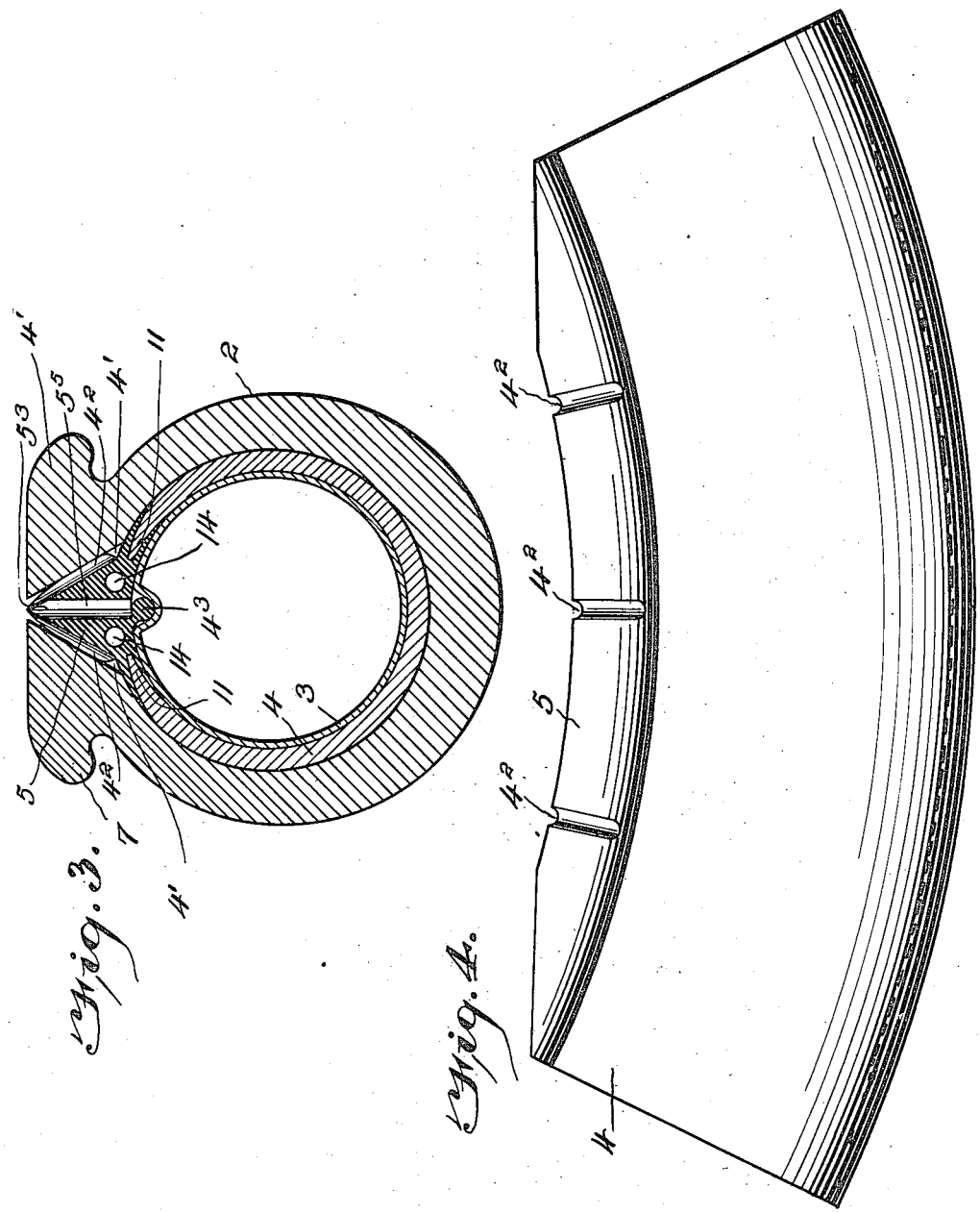

UNITED STATES PATENT OFFICE.

WILLIAM G. HAIGLER, OF COLORADO SPRINGS, COLORADO.

PNEUMATIC VEHICLE-TIRE.

1,252,107.  Specification of Letters Patent.  Patented Jan. 1, 1918.

Application filed May 8, 1916.   Serial No. 96,094.

*To all whom it may concern:*

Be it known that I, WILLIAM G. HAIGLER, a citizen of the United States, residing at Colorado Springs, in the county of El Paso and State of Colorado, have invented certain new and useful Improvements in Pneumatic Vehicle-Tires; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to pneumatic vehicle tires and has for its object to provide certain improvements in the construction and arrangement thereof which render a pneumatic tire more durable and resilient, and which effectually prevents the chafing and pinching of the inner tube of the tire, which chafing and pinching is a prevalent source of trouble and annoyance to the users of pneumatic tires of ordinary construction.

With this object in view the invention consists in the novel construction and arrangement of the tire and particularly in the combination of parts, as will be hereinafter fully described and then specifically pointed out in the appended claims.

Referring to the accompanying drawings—

Fig. 3 is a sectional view illustrating a modification, and

Fig. 4 is an elevation of a blow out patch constructed in accordance with this invention as illustrated in section in Figs. 1 to 5 inclusive.

Like numerals of reference indicate the same parts throughout the two figures, in which—

1 indicates the pneumatic tire which may be of the clencher or straight side type as shown in the accompanying drawings, which comprises the outer casing or shoe 2 and the inner tube 3.

Figure 1:
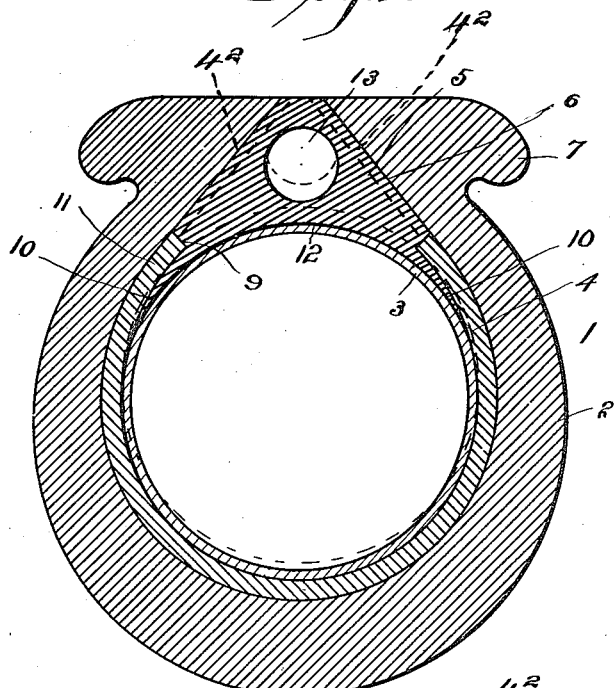
Figure 1 is a sectional view through a tire of the clencher type constructed in accordance with this invention.
Figure 2:
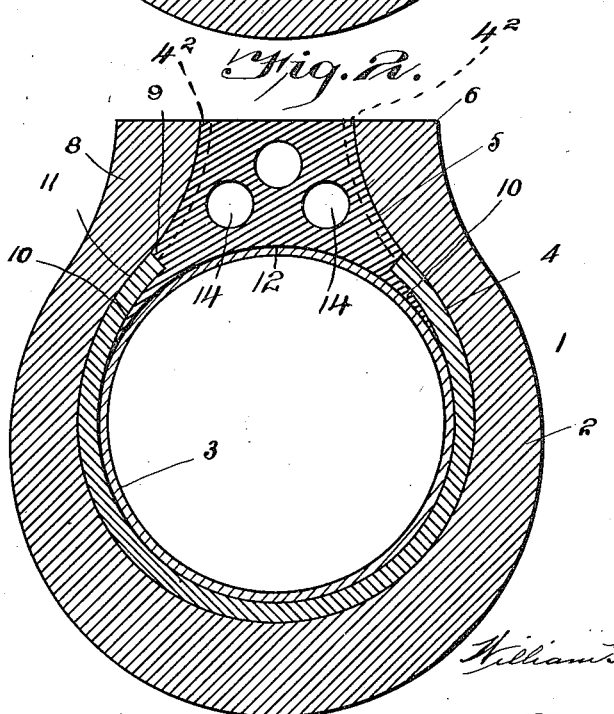
Fig. 2 is a sectional view through a tire of the straight side type constructed in accordance with this invention.

As distinguishing this construction from the usual pneumatic tire it will be seen by referring to the accompanying drawings and particularly to Figs. 1 and 2 that an auxiliary removable member 4 of fabric or the like is interposed between the inner tube 3 and the casing or shoe 2, and it will be further seen that a filling member 5 is arranged within the shoe 2, the same having sides 6 which conform neatly to the interior surface of the shoe 2 in proximity to the tire bead 7 or straight side wall 8 according to the type of the tire. It will further be seen that this filling member 5 is provided with shoulders 9 and feathered edges 10 to meet and overlap the end portions 11 of the auxiliary tread member 4, while said filling member 5 is provided with a concave surface 12 to provide a circular cross-section and to normally support the inner tube 3 in a perfectly round contour in cross-section, thus preventing the usual distortion of the inner tube and maintaining same out of contact with the wheel rim (not shown) thus effectually preventing the chafing of the tube on the rim and the pinching of the tube between the casing or shoe 2 and the wheel rim, the feathered construction of the edges 10 of the filling member 5 as well as the shoulders 9 thereon effectually preventing any pinching of the tube between the filling member 5 and the auxiliary tread member 4.

Referring particularly to the filling member 5, the same is preferably constructed of a suitable material such as rubber or rubber and fabric and is provided throughout its body with a relatively large chamber 13 or with a plurality of smaller chambers 14, said chamber or chambers being closed to the atmosphere so as to produce a cushioning action when the tire is in use. As will be seen from Figs. 1 and 2 and particularly from the dotted lines therein the filling member 5 by reason of the chambers 13 and 14 compressed under stress so as to more effectually cushion the inner tube and thereby increase the resiliency of the tire, while at the same time relieving the inner tube of a portion of the strain to which it is subjected under heavy blows from the roadway.

Referring to Figs. 3 and 4 it will be seen that the removable fabric member 4 is secured directly to the filling member 5 which in this instance is composed of two sections meeting at the central line $5^3$, said members having at their meeting edges a series of radial grooves $5^5$ leading from the inner tube 3 to the wheel rim (not shown), the purpose of the construction being to freely ventilate the tube 3 and prevent the accumulation of heat between the tube 3 and the fabric member 4. In order to relieve the tire of heat between the fabric member 4 and the shoe 2, I provide as shown in Figs. 3 and 4 a slight chamber 4' which communicates with the radial grooves 4² in the outer sides of the members of the filler section 5. As shown in dotted lines in Figs. 1, and 2, I provide the filler member 5 with these radial grooves 4² so as to allow heat generated between the fabric member 4 and the shoe 3 to freely escape.

Referring again to Fig. 3, it will be seen that I provide one of the members of the filler section 5 with a continuous preferably cylindrical member 4³ at the meeting surfaces of the filler sections so as to prevent the tube 3 from blowing out through the radial grooves 5⁵.

For tire repair purposes, a blow out patch in accordance with Fig. 3 can be advantageously constructed as shown in Fig. 4. In this instance the fabric member 4 is not continuous throughout the tire, but is relatively short and is to be inserted between the shoe 2 and the tube 3 for the purpose of preventing the tube 3 from blowing through a ruptured or weak casing or shoe. It will, therefore, be understood that the devices as illustrated in Figs. 1 to 3 inclusive may entirely inclose the inflatable tube 3 so as to form a continuous structure throughout the entire casing or shoe 2, or the structure may be of a length inclosing the inflatable tube 3 only partially of its annular surface, as for instance as illustrated in elevation in Fig. 4.

Having thus described the invention and its advantages, what I claim as new and desire to secure by Letters Patent of the United States is—

1. A pneumatic vehicle tire, including a casing or shoe, an inner inflatable tube, an intermediary auxiliary tread member, cushioning filler means adapted to fill in between and contact with the rim attaching terminals of said shoe or casing, the contacting surfaces of said filler means and said tread member being adapted to guard against the radial displacement of said filler means, said filler means having its terminal portions formed to receive and conform to the terminals of said auxiliary tread member, the terminals of said filler means feathering past the terminals of the tread member, the inflating of said inflatable tube effecting the wedging together of said auxiliary tread member and said filler means, said filler means being itself provided with a plurality of radial ventilating grooves disposed in the sides thereof contacting with the rim attaching terminals of the shoe or casing.

2. A pneumatic vehicle tire, including a shoe or casing, an inner inflatable tube, an intermediary auxiliary tread member interposed with respect to said shoe and said tube, a cushioning filler means having radial ventilating grooves establishing communication between said inflatable tube and the outside and having radial ventilating grooves establishing communication between the inside of the shoe or casing and the outside, said filler means having attached thereto a member positioned at the inner ends of the first mentioned radial grooves and between said inflatable tube and said filler means to allow ventilation of the tube and to prevent said inflatable tube from blowing-out through the first mentioned radial grooves.

In testimony whereof, I affix my signature, in presence of two witnesses.

WILLIAM G. HAIGLER.

Witnesses:
 NELLIE HANNA,
 W. B. PRICE.